(12) United States Patent
Medcalf

(10) Patent No.: US 7,030,870 B2
(45) Date of Patent: Apr. 18, 2006

(54) ON SCREEN DISPLAY (OSD)

(75) Inventor: Christopher Medcalf, Bristol (GB)

(73) Assignee: Pace Micro Technologies, Plc, Shipley (GB)

( * ) Notice: Subject to any disclaimer, the term of this patent is extended or adjusted under 35 U.S.C. 154(b) by 425 days.

(21) Appl. No.: 09/965,190

(22) Filed: Sep. 27, 2001

(65) Prior Publication Data

US 2002/0039150 A1    Apr. 4, 2002

(30) Foreign Application Priority Data

Sep. 30, 2000    (GB) .................................. 0023998

(51) Int. Cl.
G09G 5/00    (2006.01)
(52) U.S. Cl. ...................... 345/213; 348/569
(58) Field of Classification Search ........ 345/211–213; 348/563–566, 569
See application file for complete search history.

(56) References Cited

U.S. PATENT DOCUMENTS

| | | | | |
|---|---|---|---|---|
| 4,345,246 A * | 8/1982 | van den Driessche | ........ | 345/13 |
| 5,523,791 A | 6/1996 | Berman | ...................... | 348/584 |
| 5,640,172 A * | 6/1997 | Kim | ............................. | 345/26 |
| 5,670,972 A * | 9/1997 | Kim | ............................. | 345/13 |
| 5,724,104 A * | 3/1998 | Eom | ........................... | 348/569 |
| 5,734,437 A * | 3/1998 | Back | .......................... | 348/563 |
| 5,838,386 A * | 11/1998 | Kim | ........................... | 348/569 |
| 5,889,500 A * | 3/1999 | Chuang et al. | ............... | 345/10 |
| 5,969,727 A * | 10/1999 | Kaneko | ...................... | 345/536 |
| 6,008,861 A * | 12/1999 | Chon | ......................... | 348/569 |
| 6,091,457 A | 7/2000 | Bril | ............................. | 348/553 |
| 6,195,087 B1 * | 2/2001 | Wu | ............................. | 345/213 |
| 6,377,275 B1 * | 4/2002 | Kim | ........................... | 345/618 |
| 6,424,341 B1 * | 7/2002 | Choi | .......................... | 345/204 |
| 6,611,270 B1 * | 8/2003 | Hosotani | ..................... | 345/530 |

OTHER PUBLICATIONS

"A Universal High Performance Digital Performance Television Controller" IEEE Transactions on Consumer Electronics, vol. 36, No. 3, Aug. 1, 1990.

* cited by examiner

*Primary Examiner*—Xiao Wu
(74) *Attorney, Agent, or Firm*—Head, Johnson & Kachigian

(57) ABSTRACT

The invention relates to the generation of an on-screen display and a control system for the same which allows the known problems in display which can occur to be avoided. Upon change of at least part of an OSD, the system continues until a request to redraw the display is received. At this stage, if the Vsync signal of the display screen has occurred since the change the redraw occurs immediately, thereby avoiding unnecessary delay.

9 Claims, 1 Drawing Sheet

ON SCREEN DISPLAY (OSD)

CROSS-REFERENCE TO RELATED APPLICATION

This application claims priority to British Patent Application No. 0023998.8 filed 30 Sep. 2000.

BACKGROUND OF THE INVENTION

The invention relates to the provision and improvement to the provision of information to a user of a television system by the provision of an On Screen Display (OSD) on a display screen such as that of a television set.

The generation of OSD's on television screens to provide information users is well known. However certain sequences of OSD generation operations can cause unwanted visual effects on the screen. Some known sequences of OSD deletion and creation which have been found in certain instances to cause problems include when the deletion of an OSD region occurs followed by the creation of another OSD region on screen. Secondly, a change in position of a region, followed by a drawing operation to that same region can cause problems and thirdly, changing the displayed data buffer for a region, followed by a drawing operation to the previously displayed buffer of the region, can also cause problems.

In addition to the operations indicated above, other operations may cause other situations which potentially cause unwanted effects, for instance the resizing of a region of the OSD.

Yet further, there is the problem of visual artefacts occurring under certain circumstances. Some of these circumstances can be include the updating of the OSD linked list, due to the change in time between changing the OSD linked list and the actioning of that change by processing means such as a decoder of a broadcast data receiver. The broadcast data receiver is the item of apparatus, provided integrally with the television set or connected thereto, which allows for the processing of received video, audio and/or auxiliary data from remote locations, and the processing of the same to allow video, audio and the auxiliary information, such as on screen displays, to be generated on the display screen of the television set.

In practice, the generation of such artefacts are usually avoided by waiting for the generation of a Vertical synchronization (vsync) signal to occur on the display screen after any change to the linked list has been made.

However, a problem with waiting for the vsync signal to occur before changing the OSD is that a delay in the desired change of the OSD is caused while awaiting the vsync signal and this can be irritating to the user and may, in many cases, appear, to the user at least, to be an unnecessary delay.

The aim of the present invention is to provide a method whereby upon changing an OSD, the system can, if necessary, await the vsync signal prior to the new display but, if not necessary, need not wait, thereby avoiding unnecessary delay.

SUMMARY OF THE INVENTION

In a first aspect of the invention there is provided a system for the control of the generation of an on-screen display (OSD) on a display screen, and wherein, upon the deletion, change or movement of an area of a first on screen display, control means for the display continue to operate the system until a request to generate, add or otherwise alter the display of the said area is received whereupon the control means detects whether or not a Vsync signal for the display screen has occurred since the change to the area of the first display.

In one embodiment, if the Vsync signal has occurred, the generation addition or other alteration with regard to the area of the OSD occurs immediately. If no Vsync signal has occurred then the control means delays the new operation until the Vsync has occurred.

Typically, if a region of the OSD is deleted, the system can continue in operation until a request to create a new region is made. At that time, if a vsync signal has occurred since the deletion, the creation can take place immediately. If not, the creation must wait until a vertical sync occurs.

In a further embodiment, if the display buffer of a region is changed, the system can continue until a request to draw into the previously displayed buffer of the region is received, at which point the generation of said second display wait for a vsync signal if one has not occurred since the buffer content was changed.

In a yet further embodiment, if a region of the first display is moved, the system continues until a request to draw into its display buffer is received at which time the processing can continue immediately if a vsync signal has occurred since the movement of the region of the first display, otherwise the drawing command must wait for a vsync signal.

The invention as set out adds intelligence to the system by establishing whether there is and, if possible, eliminating, the need to wait for a vsync signal before generating the second display is actually required. If the delay is not required because the subsequent modification would not in fact cause an artefact then the update and generation of the second display can proceed without delay.

Typically, therefore, when the request for an alteration is made, the first OSD display continues to be displayed until the generation of the change occurs and so the user continues to view the first OSD display however the time for which they need to do so after the request which has commenced the need for alteration, can be reduced in accordance with the invention as the system does not always have to wait for the vsync signal to occur before generating the alteration, if the vsync signal has already occurred between the initial request and the command for commencing the alteration.

Figure 1:
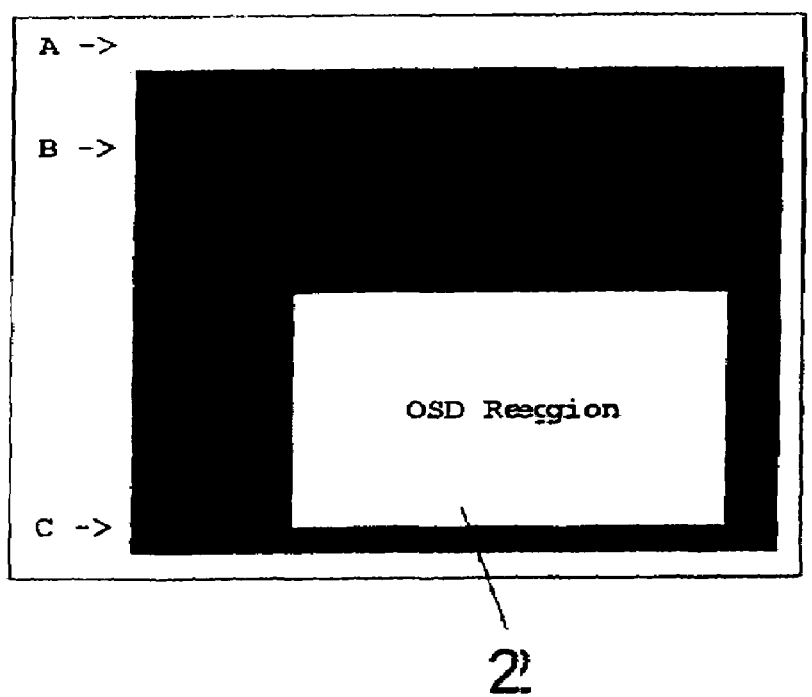
FIG. 1 shows the system according to the present invention.

A specific embodiment of the invention is now described with reference to the accompanying FIGURE

DESCRIPTION OF THE PREFERRED EMBODIMENTS.

In this example, the control means and system are provided as part of a broadcast data receiver and includes integrated circuit processing chips such as the ST3520 and 5512.

The conventional problem occurs because the integrated circuit devices need to 'look ahead' at the OSD information headers, to determine where on the display screen the OSD should be displayed. However the data which is actually to be displayed in the OSD is not read until it is required for the display to be generated.

Typically therefore the system includes a control means with a memory in which OSD definitions in a linked-list are held. A device register is provided which points to the head of the list. In this embodiment, there are two linked-lists, one for each video field, and similarly two registers.

In conventional procedures, when a vertical synchronization pulse occurs at point A in FIG. 1, the device register associated with the field at that location is read, and the header of the OSD region it references is also read. At this time, therefore, it becomes inevitable that the first OSD 2 region will be displayed. If at a slightly later time indicated by point B on FIG. 1 a region of the OSD is deleted this will not take effect until the display of this field is complete. However, if the second OSD display is generated before the time and location indicated by point C on FIG. 1, then the memory freed by deleting the first region will then be reused, and any writes to that memory may be seen on screen in the display of the current field.

In a further conventional example, when the displayed buffer of the region is changed the displayed buffer is seen until the next vsync signal and any new data written to the buffer before the generation of the vsync signal time may be seen on screen.

In a yet further conventional example, in the case of a moved region, the movement does not take effect until the next vertical sync. Any drawing to the region will be seen at the old position until the next vsync signal.

Thus in accordance with the conventional approach unwanted visual effects are avoided by waiting for a vsync signal after any change is made to the linked-list of OSD headers, including addition or removal of a region or a change in a region's position and, while this prevents the visual effects it slows down operation of the OSD often unnecessarily.

In accordance with the invention, delays can be reduced or eliminated by initially deferring the wait for a vsync signal.

Thus, in the situation set out in the first conventional example given above, in accordance with the invention, if a region is deleted from the first display, the system will continue in operation, without waiting for a vsync signal, and will continue until a request is received to generate the second display. If at the time of the request being received, a vsync signal has occurred, the control means can proceed to create the second display immediately. If no vsync signal has occurred then the control means will wait until this occurs.

In the situation set out in the second conventional example, in accordance with the invention, if the displayed buffer of a region is changed, the control means continues in operation until a request to draw into the previously displayed buffer of the region is received. If at the time of the request a vsync signal has occurred since the change of the buffer the drawing can occur immediately or alternatively the control means must wait until a vsync signal does occur.

In the third situation, in accordance with the invention, if a region of the first display is moved, the control means will continue until a request is received to draw into the displayed buffer at which time drawing occurs immediately if a vsync signal has occurred since the move or alternatively the control means must wait until the vsync signal is generated.

This solution allows operations that will not cause visual artefacts, to be performed without unnecessary waiting or delay, and also smoothes some of the peaks of processor/OSD activity at the time of the vertical sync signal.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

The invention claimed is:

1. A system for the control of the generation of an on-screen display on a display screen, said system comprising:
    control means for the display which continue to operate the system upon movement of an area of a first on-screen display or deletion of a region of a first on-screen display, until a request to draw into a data buffer memory of the display or to create a new region on the display is received respectively, whereupon the control means detects whether or not a vertical synchronization signal for the display screen has occurred in an interim period since the movement of the area or deletion of the region of the first display and if the vertical synchronization signal has occurred in the interim period said drawing into the data buffer memory or creation of the new region with regard to the on-screen display occurs immediately.

2. A control system according to claim 1 wherein drawing into the data buffer memory or creation of the new region with regard to said on-screen display waits for a later vertical synchronization signal if no vertical synchronization signal has occurred in the interim period.

3. A system according to claim 1 wherein said system is controlled with regard to the occurrence of the vertical synchronization signal with respect to those changes in said on-screen display which would not cause an artefact to be created on screen.

4. A system according to claim 1 wherein when the request for an alteration is made, the first said on-screen display continues to be displayed until the generation of the change occurs.

5. A control system according to claim 1 wherein said control means delays a new operation until the vertical synchronization signal has occurred.

6. A control system according to claim 1 wherein processing proceeds immediately when a vertical synchronization signal has occurred since the movement of the part of the first on-screen display, otherwise the command to redraw the display waits for a vertical synchronization signal to occur.

7. A control system according to claim 1 wherein creation may occur immediately when the vertical synchronization signal had occurred since the deletion.

8. A system for the control of the generation of an on-screen display on a display screen, said system comprising:
    a control means for the on-screen display which continues to operate the system upon movement of an area of a first on-screen display or deletion of a region of the first on-screen display until a request to draw into a data buffer memory of the display or create a new region on the display is received respectively whereupon the control means detects whether or not a vertical synchronization signal for the display screen has occurred in an interim period since the change to the area of the first display and said system continues when part of the first display is moved until a request to draw into its display buffer memory is received.

9. A system for the control of the generation of an on-screen display on a display screen, said system comprising:

a control means for the on-screen display which continues to operate the system upon movement of an area of a first on-screen display or deletion of a region of the first on-screen display until a request to draw into a data buffer memory of the display or create a new region on the display is received respectively whereupon the control means detects whether or not a vertical synchronization signal for the display screen has occurred in an interim period since the change to the area of the first display and the system continues in operation until a request to create a new region is made when a region of the first on-screen display is deleted.

* * * * *